(12) United States Patent
Jiang et al.

(10) Patent No.: US 7,214,331 B2
(45) Date of Patent: May 8, 2007

(54) CATALYST CONFIGURATION AND METHODS FOR SYNGAS PRODUCTION

(75) Inventors: Weibin Jiang, New Providence, NJ (US); Adeola F. Ojo, Scotch Plains, NJ (US); Sudhakar R. Jale, Camarillo, CA (US); Satish S. Tamhankar, Scotch Plains, NJ (US); Bruce Walter Uhlman, Mount Arlington, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 429 days.

(21) Appl. No.: 10/787,606

(22) Filed: Feb. 26, 2004

(65) Prior Publication Data
US 2005/0191233 A1    Sep. 1, 2005

(51) Int. Cl.
*C01B 3/26*    (2006.01)

(52) U.S. Cl. .................... 252/373; 502/527.12

(58) Field of Classification Search ........... 252/373
See application file for complete search history.

(56) References Cited

U.S. PATENT DOCUMENTS

| | | | |
|---|---|---|---|
| 4,048,091 A | 9/1977 | Barnaba | |
| 4,492,769 A | 1/1985 | Blanchard et al. | |
| 4,522,894 A | 6/1985 | Hwang et al. | |
| 4,537,873 A | 8/1985 | Kato et al. | |
| 4,680,282 A | 7/1987 | Blanchard et al. | |
| 4,844,837 A | 7/1989 | Heck et al. | |
| 4,863,707 A * | 9/1989 | McShea et al. | 423/359 |
| 4,897,253 A | 1/1990 | Jenkins | |
| 4,927,799 A | 5/1990 | Matsumoto et al. | |
| 5,013,705 A | 5/1991 | Koberstein et al. | |
| 5,023,276 A | 6/1991 | Yarrington et al. | |
| 5,232,889 A | 8/1993 | Blanchard et al. | |
| 5,368,835 A | 11/1994 | Choudhary et al. | |
| 5,431,855 A | 7/1995 | Green et al. | |
| 5,441,581 A | 8/1995 | Van den Sype et al. | |
| 5,500,149 A | 3/1996 | Green et al. | |
| 5,510,056 A | 4/1996 | Jacobs et al. | |
| 5,580,536 A | 12/1996 | Yao et al. | |
| 5,639,401 A | 6/1997 | Jacobs et al. | |

(Continued)

FOREIGN PATENT DOCUMENTS

EP    0 303 438 A2    2/1989

(Continued)

OTHER PUBLICATIONS

K. Miyoshi, N. Sugijima, M. Kobayashi; JP 11-342334 A; "NOx Removal Catalyst, Its Production and Method for Removing NOx Using the Same"; Appln. No. JP11086745; Appln. Date: Mar. 29, 1999; Assignee: Nippon Shokubai Co Ltd; ABSTRACT.

(Continued)

*Primary Examiner*—Wayne A. Langel
(74) *Attorney, Agent, or Firm*—Philip H. Von Neida

(57) ABSTRACT

An improved process for the catalytic partial oxidation of hydrocarbons to produce hydrogen and carbon monoxide is disclosed. The process also utilizes a novel catalyst configuration containing at least two serially aligned layers containing a noble metal or transition metal catalyst supported on a support. Alternatively the process employs only the first layer of a catalytically active metal dispersed on an inert carrier support to partially oxidize hydrocarbons.

30 Claims, 1 Drawing Sheet

U.S. PATENT DOCUMENTS

| | | |
|---|---|---|
| 5,648,582 A | 7/1997 | Schmidt et al. |
| 5,658,497 A | 8/1997 | Kumar et al. |
| 5,785,774 A | 7/1998 | Van den Sype et al. |
| 5,856,585 A | 1/1999 | Sanfilippo et al. |
| 5,883,138 A | 3/1999 | Hershkowitz et al. |
| 5,965,481 A | 10/1999 | Durand et al. |
| 5,976,721 A | 11/1999 | Limaye |
| 6,051,162 A | 4/2000 | Van den Sype et al. |
| 6,254,807 B1 | 7/2001 | Schmidt et al. |
| 6,329,434 B1 | 12/2001 | Wen et al. |
| 6,436,363 B1 | 8/2002 | Hwang et al. |
| 6,455,597 B2 | 9/2002 | Hohn et al. |
| 6,458,334 B1 | 10/2002 | Tamhankar et al. |
| 6,459,119 B1 | 10/2002 | Huang et al. |
| 6,562,749 B1 | 5/2003 | Lednor et al. |
| 6,733,692 B2 * | 5/2004 | Dindi et al. ............... 252/373 |
| 6,902,717 B2 * | 6/2005 | Kramer et al. ............. 423/651 |
| 2001/0041159 A1 | 11/2001 | Tamhankar et al. |
| 2003/0021748 A1 | 1/2003 | Hwang et al. |
| 2003/0083198 A1 | 5/2003 | Xu et al. |
| 2003/0096880 A1 | 5/2003 | Wang et al. |
| 2003/0153632 A1 | 8/2003 | Wang et al. |
| 2003/0166463 A1 | 9/2003 | Tamhankar et al. |
| 2003/0198592 A1 | 10/2003 | Allison et al. |
| 2004/0075084 A1 * | 4/2004 | Kramer et al. ............. 252/373 |

FOREIGN PATENT DOCUMENTS

| | | |
|---|---|---|
| EP | 0 524 643 A1 | 1/1993 |
| EP | 0 548 679 A1 | 6/1993 |
| EP | 0 576 096 B1 | 12/1993 |
| EP | 0 462 593 | 11/1994 |
| EP | 0 640 561 A1 | 3/1995 |
| EP | 0 781 591 A2 | 7/1997 |
| EP | 1 134 188 A2 | 9/2001 |
| EP | 1 136 115 A1 | 9/2001 |
| EP | 1 452 505 | 9/2004 |
| GB | 1399137 | 6/1975 |
| WO | WO 92/11199 | 7/1992 |
| WO | WO 93/01130 | 1/1993 |
| WO | WO 98/35908 | 8/1998 |
| WO | WO 99/48805 | 9/1999 |
| WO | WO 01/81241 | 11/2001 |
| WO | WO 02/18269 | 3/2002 |
| WO | WO 03/033431 | 4/2003 |
| WO | WO 03/099712 | 12/2003 |
| WO | WO 2004/024324 | 3/2004 |

OTHER PUBLICATIONS

Sintered Ceria: A New Dense and Fine Grained Ceramic Material by J.F. Baumard, C. Gault and A. Argoitia; Journal of the Less-Common Metals, 127 (1987) 125-130, no month.

"A Comparative Study of Oxygen Storage Capacity Over $Ce0.6 Zr0.4 O2$ Mixed Oxides Investigated by Temperature-Programmed Reduction and Dynamic OSC Measurements," Hickey et al., Catalysis Letters, vol. 72, No. 1-2, (2001), pp. 45-50, no month.

"Effect of Ceria Structure on Oxygen Migration for Rh/Ceria Catalysts," by Cordatos et al., J. Phys. Chem., 100, No. 2, (1996), pp. 785-789, no month.

"Tape Cast Solid Oxide Fuel Cells for the Direct Oxidation of Hydrocarbons," Park et al., Journal of the Electrochemical Society, 148 (5), pp. A443-A447 (2001), no month.

"Catalytic Partial Oxidation of Methane to Synthesis Gas Over $Ni-CeO2$," Zhu et al., Applied Catalysis A: General 208, pp. 403-417 (2001), no month.

"Catalytic Partial-Oxidation of Methane on a Ceria-Supported Platinum Catalyst for Application in Fuel Cell Electric Vehicles," Pino et al., Applied Catalysis A: General 225, pp. 63-75 (2002), no month.

K. Otsuka, T. Ushiyama and I. Yamanaka, "Partial Oxidation of Methane Using the Redox of Cerium Oxide," Chemistry Letters, pp. 1517-1520, 1993, no month.

E.S. Putna, J. Stubenrauch, J.M. Vohs, R.J. Gorte, "Ceria-Based Anodes for the Direct Oxidation of Methane in Solid Oxide Fuel Cells," Langmuir, vol. 11, No. 12, 1995, pp. 4832-4837, no month.

International Search Report from the Intellectual Property Office of New Zealand, mailed Feb. 1, 2005.

* cited by examiner

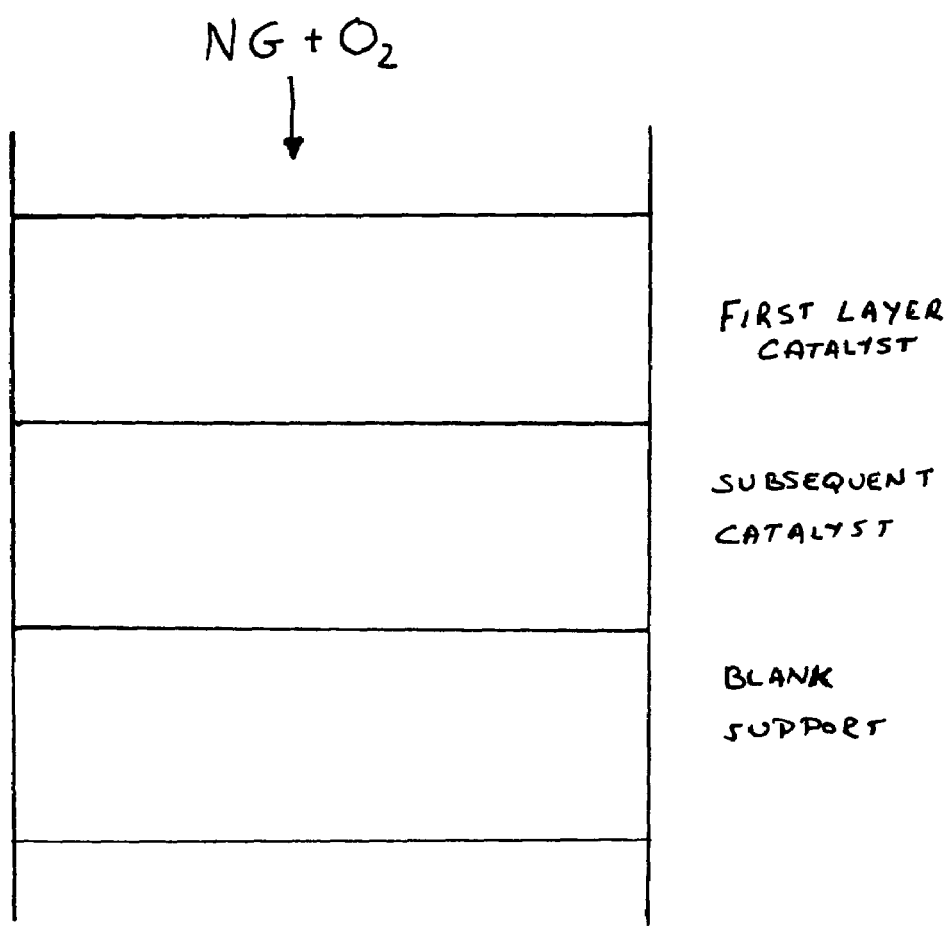

CATALYST CONFIGURATION AND METHODS FOR SYNGAS PRODUCTION

BACKGROUND OF THE INVENTION

The conversion of hydrocarbons to hydrogen and carbon monoxide containing gases is well known in the art. Examples of such processes include catalytic steam reforming, auto-thermal catalytic reforming, catalytic partial oxidation and non-catalytic partial oxidation. Each of these processes has advantages and disadvantages and produces various ratios of hydrogen and carbon monoxide, also known as synthesis gas (syngas). The present invention is directed to a catalytic partial oxidation process.

Partial oxidation processes are also well known and the art is replete with various catalytic partial oxidation processes. Partial oxidation is an exothermic reaction wherein a hydrocarbon gas, such as methane, and an oxygen-containing gas, such as air, is contacted with a catalyst at elevated temperatures to produce a reaction product containing high concentrations of hydrogen and carbon monoxide. The catalysts used in these processes are typically noble metals, such as platinum or rhodium, and other transition metals, such as nickel, all on a suitable support.

Partial oxidation processes convert hydrocarbon-containing gases, such as natural gas to hydrogen, carbon monoxide and other trace components such as carbon dioxide and water. The process is typically carried out by injecting preheated hydrocarbons and an oxygen-containing gas into a combustion chamber where oxidation of the hydrocarbons occurs with less than stoichiometric amounts of oxygen for complete combustion. This reaction is conducted at very high temperatures, such as in excess of 700° C. and often in excess of 1,000° C., and pressures up to 150 atmospheres. In some reactions, steam or carbon dioxide can also be injected into the combustion chamber to modify the synthesis gas product and to adjust the ratio of hydrogen to carbon monoxide.

More recently, partial oxidation processes have been disclosed in which the hydrocarbon gas is contacted with the oxygen-containing gas at high space velocities in the presence of a catalyst such as a metal deposited on a ceramic monolith (e.g. foam or honeycomb) support. The monolith supports are impregnated with a noble metal such as platinum, palladium or rhodium, or other transition metals such as nickel, cobalt, chromium and the like. Typically, these monolith supports are prepared from solid refractory or ceramic materials such as alumina, zirconia, magnesia and the like. During operation of these reactions, the hydrocarbon feed gases and oxygen-containing gases are initially contacted with the metal catalyst at temperatures in excess of 400° C., typically in excess of 600° C., and at a standard gas hourly space velocity (GHSV) of over 100,000 per hour.

It has been found that the most suitable fixed arrangement for the catalyst for use in the catalytic partial oxidation of hydrocarbons under conditions which would be commercially attractive is one in which the catalyst is retained in the form of reticulate monolithic structure. Catalysts for use in such a process comprise one or more catalytically active components supported on a refractory oxide carrier, the carrier being in the form of a reticulate monolith.

However, it has now been found that problems can occur in the operation of the partial oxidation process when using a reticulate monolithic catalyst. In particular, it has been found that the refractory monolithic catalyst structures are very susceptible to thermal shock and high temperature prevailing in the catalytic partial oxidation process, causing brittleness of the structure and ultimately leading to catalyst disintegration, especially when using oxygen rather than air. Accordingly, it is an objective of the present invention to provide a catalytic partial oxidation process, which combines a high level of carbon conversion to syngas with high selectivity and a high level of structural stability of the catalyst at high temperature.

SUMMARY OF THE INVENTION

The present invention provides a process for the catalytic partial oxidation of a hydrocarbon feedstock, which comprises contacting a feed gas comprising a hydrocarbon feedstock and oxygen-containing gas with a catalyst under conditions such that the catalyst will be susceptible to thermal shock and high temperature, and still retains its structural integrity and performance. In particular, this invention is directed to a novel multi-layer catalyst configuration inside the reactor so that the catalysts employed are particularly robust with good thermal and mechanical stability under the extreme conditions prevailing in the presence of the partial oxidation.

The multi-layer catalyst configuration employed in the present invention comprises at least two serially aligned layers, each layer containing a noble or transition metal catalyst supported on a monolith structure. Typically, the front layer of the catalyst configuration is always at a higher temperature than the subsequent layers due to the contribution of exothermic reactions in the front layer followed by the endothermic reforming reaction.

The hydrocarbons that are employed in the feed gas are typically alkanes having from 1 to about 4 carbon atoms. Most preferably, the hydrocarbon is selected from the group consisting of natural gas and methane.

BRIEF DESCRIPTION OF THE DRAWINGS

The FIGURE is a schematic representation of a multi-layer catalyst.

DETAILED DESCRIPTION OF THE INVENTION

The partial oxidation of methane and other hydrocarbons is exothermic and under ideal conditions can proceed according to the stoichiometry of equation 1 to yield a syngas mixture with an $H_2$:CO ratio of 2:1 and equilibrium temperature less than 1100° C.

$$CH_4 + \tfrac{1}{2}O_2 \rightarrow CO + 2H_2 \qquad (1)$$

It has also been suggested that in catalytic partial oxidation bed, that the partial oxidation occurs in the first few millimeters of bed length. See Hickman and Schmidt, Syngas Gas Formation by Direct Oxidation of Methane Over Pt Monoliths, 138 J. Catalysis 267, 275 (1992). Therefore it is logically thought that only a small portion of the catalyst bed is needed to catalyze the reaction.

However we discovered that the actual temperature in the first few millimeters of the catalyst during a catalytic partial oxidation is much higher than expected. As shown in example 1, cordierite material melts when it is used as support for pure oxygen-based catalytic partial oxidation process despite its melting point of 1450° C., which is significantly higher than the expected reaction temperature of less than 1100° C.

It has been found that nearly complete oxygen conversion is achieved in the first few millimeters of the catalyst and reaction performance improves when the length of the catalyst bed is increased. As shown in example 2, by stacking a reticulate catalytic monolith beneath large-pore honeycomb catalyst, higher hydrocarbon conversion and syngas selectivity are achieved.

Based on the above observations, it appears that direct partial oxidation is a combined effect of combustion, partial oxidation, steam and $CO_2$ reforming and water gas shift reaction. In the front of the reaction zone where feed gas contacts catalyst first, possibly only in the first few millimeters, oxidation reactions such as combustion, shown in equation 2, and partial oxidation, as in equation 1, compete with each other, leading to almost complete oxygen conversion.

$$CH_4 + 2O_2 \rightarrow CO_2 + 2H_2O \qquad (2)$$

Heat released by the exothermic oxidation reaction provides enough energy to further convert the unreacted hydrocarbon species with steam or $CO_2$ produced from combustion reaction to syngas, through endothermic steam and $CO_2$ reforming reactions (3) and (4) together with some water-gas shift or reverse water-gas shift reactions (5).

$$CH_4 + H_2O \rightarrow CO + 3H_2 \qquad (3)$$

$$CH_4 + CO_2 \rightarrow 2CO_2 + 2H_2 \qquad (4)$$

$$H_2O + CO \longleftrightarrow CO_2 + H_2 \qquad (5)$$

This explains the excess amount of heat at the front of the reaction zone, of more than 1450° C., causing extreme high temperature in the front layer. The endothermic nature of the reforming reaction rapidly cools the subsequent catalyst to less than 1100° C. As a result, the catalyst zone temperature is extremely high in the front layer followed by lower temperatures downstream.

A significant problem can arise in the operation of partial oxidation processes when using a reticulate monolithic catalyst at such high temperatures of more than 1450° C., where we discovered that reticulate monolith supports, such as those made of partially stabilized zirconia (PSZ) or $Al_2O_3$, are very susceptible to high temperatures and thermal shock, and ultimately lead to catalyst instability and brittleness after reaction. There are several potential reasons attributed to brittleness of reticulate monolith: hollow web-type structure is inherently weak at high temperature, phase transition of PSZ material and so on. However when the reaction temperature is controlled at less than 1100° C., reticulate monolith supports such as partially stabilized zirconia (PSZ) or $Al_2O_3$ can maintain their mechanical strength and give excellent reaction performance.

While trying to address this problem, we have also discovered that for materials such as $Al_2O_3$ with the same thermal properties will give stronger structural strength when made into a thick-wall honeycomb support than when fabricated into a reticulate structure. In spite of poorer reaction performance, it does maintain its good mechanical strength after reaction. The temperature of the gas stream after honeycomb catalyst drops below 1100° C.

Therefore an effective method of addressing this problem is to use more structurally robust and thermally stable material such as a thick-walled honeycomb support in the front to 'shield' the high temperature. When catalyst temperature drops below 1100° C. due to endothermic reactions, a reticulate monolith support with catalytic material is followed to ensure a high level of hydrocarbon conversion to syngas with high selectivity and a high level of catalyst stability.

A catalyst bed in a multi-layered configuration using substrates that have different thermal, mechanical and physical properties to improve the overall catalyst stability for high temperature operations is disclosed. The first catalyst layer at the front end of the bed will have improved resistance to thermal shock and stability at high temperature than the subsequent layers, where nearly complete oxygen conversion is achieved. Corresponding carbon conversion and syngas selectivity may not be high.

The preferred catalyst substrates to use in the first layer at the feed side are particulates including spheres, pellets and rings; wagonwheels, Saint-Gobain Norpro's Ty-Pak®, Hex-Pak™, Snowflake® media, and Norton® saddles, gauze wire, honeycomb monoliths or any other suitable supports in any acceptable manufactured shapes such as those listed herein, although reticulated monoliths with improved mechanical strength can also be used. This mechanical strength can be illustrated for purposes of the present invention as "crush strength" which is the maximum stress that a material can sustain under crush loading. The crush loading is that weight and/or pressure that will fracture or compact the catalyst substrate. The catalyst substrates of the present invention will have a crush strength that can withstand the typical operating conditions of a partial oxidation process of hydrocarbons. Accordingly the catalyst substrates of the present invention will not lose crush strength during the normal operation of a partial oxidation process for hydrocarbons. The layered catalysts at the product side may catalyze the partial oxidation, but mainly promote reforming and water-gas shift reactions to achieve high level of carbon conversion with high syngas selectivity. The reticulated monoliths are more suitable for these subsequent layers, particularly as the last layer.

When more than two layers are used, they can be layered in any order provided the first layer is more stable to thermal shock and higher temperatures in excess of 1100° C. and the subsequent layers can further catalyze the subsequent carbon conversion to syngas. The pore structure of monoliths and the particle size of particulates are such that there is no significant pressure drop through the bed. U.S. 2003/0083198 A1 teaches a fixed bed catalyst system comprising first and second zones disposed in stacked serial flow arrangement in order to achieve better flow distribution, where first zone (upstream section) has a greater resistance to flow of the feed stream than second zone (down stream section). However, in the current invention, the first layer (upstream) can be less resistant than the second layer by using a larger pore size honeycomb rather than a reticulate monolith. A catalytically inactive substrate may be placed between each of the catalyst layers to improve the gas distribution.

Protection of the reticulated monolith catalyst either from active metal sintering or mechanical strength weakening at high temperatures can be achieved by shielding it from the high temperature using the first layer as the combustion catalyst. This concept of multi-layer catalysts is shown in the figure where NG stands for natural gas.

First Catalyst Layer

The first layer catalyst desirably should be able to operate in an oxidizing and reducing environment effectively without significant deactivation over a temperature range from about 1000° to about 1800° C. The first layer catalyst preferably comprises catalytically active metals dispersed on an inert carrier support. The metals used in the present catalysts are selected from certain transition and noble metals of the Periodic Table of Elements. Active metals can be selected from the group consisting of transition or noble metal selected from the group of nickel, cobalt, iron, platinum, palladium, iridium, rhenium, ruthenium, rhodium and osmium and combinations thereof. Preferred metals are nickel and rhodium.

The most preferred metal of this group is rhodium. The metals may be present on the support in the form of metals, metal oxides, metal halides or other metal salts prior to being reduced. Upon reduction, as described below, the metals are substantially in the metallic form. Generally, from about 0.1% to 8% by weight of the metal will be deposited on the support. Optionally Rh/Pt gauze catalyst can be used as the exothermic reaction catalyst.

U.S. 2003/0198592 A1 discloses multiple serially aligned reaction zones and multiple hydrocarbon feeds for converting a hydrocarbon and oxygen feed stream to syngas. The first reaction zone catalyzes the net partial oxidation of the feed hydrocarbon and the subsequent zone catalyzes either a water-gas shift reaction, net partial oxidation, steam or dry reforming. Some of the most selective catalysts, such as Rh, are not able to withstand the heat and retain their activity due to problems such as sintering and a limited tolerance to carbon formation. The present invention provides an advantage inasmuch as it places more of a thermally stable catalyst, such as a mixed metal oxide or a stable crystalline structure such as a spinel or perovskite, more preferably CoCrOxide, at the front of the reactor and most preferably 9.9 wt % $Cu_{0.2}Cr_{0.8}$Oxide/1 wt % Rh/6.1 wt % Yb supported on a refractory support such as alumina or zirconia, preferably partially stabilized zirconia (PSZ).

In the process of the present invention, the exothermic reaction is almost complete instantaneously after contacting the first catalyst layer. The primary function of subsequent layer is to effect the endothermic reforming reaction. The "net partial oxidation" catalyst zone is considered as the two layers comprising a combustion catalyst and an endothermic catalyst. It is important to point out that PSZ reticulate material is not preferred due to the inherent phase transition at high temperature and clearly Rh coating on $Al_2O_3$ is stable even after more than 7 months of continuous operation as the first layer. It retains its catalytic activity as well as its mechanical strength.

A preferred form of inert carrier is made of a refractory, substantially inert, rigid material which is capable of maintaining its shape with sufficient degree of mechanical strength at high temperatures. Typically, a material is selected for the support, which exhibits a low thermal coefficient of expansion, good thermal shock resistance and high melting point. For example, cordierite material is not suitable as the front layer support for pure oxygen-based partial oxidation due to its lower melting point around 1450° C.

Several general types of material for construction of such carriers are known. Honeycomb monolithic supports are commercially available in various sizes and configuration. A suitable shape and size of pellet or granule type catalyst can also be purchased commercially. Both types of support structures are made from conventional refractory or ceramic materials selected from the group consisting of alumina, mullite, zirconia, partially stabilized zirconia, ceria, silica, silicon carbide, silicon nitride, Sialon™ (a silicon nitride ceramic with a small percentage of aluminum oxide added), aluminum nitride, boron nitride, aluminosilicate, magnesium aluminosilicates, and mixtures of these. Carriers can be formed by any suitable process, including molding, pressing, extruding, spray drying or die stamping, and so on. Inert support also includes metal monolith, prepared as metal foam or sintered particles of metal at high temperature. The most preferred support is a stabilized alumina, silicon carbide or partially stabilized zirconia in the form of honeycomb, sphere, pellet, ring, wagonwheel, Saint-Gobain Norpro's Ty-Pak®, HexPak™, Snowflake® media and Norton® saddles or granule. Preferably the surface area of support is relatively low ranging from between about 0.1 and about 50 $m^2/g$.

Subsequent Catalyst Layer

The subsequent catalyst layer beneath the first layer desirably should be able to operate in oxidizing and reducing environments effectively without significant deactivation over a temperature range below about 1100° C. The endothermic reaction catalyst comprises any of the catalytic metal catalysts known for such purpose. The metal catalysts employed in the present invention are monolith support structures composed primarily of partially stabilized zirconia washcoated with cerium oxide and impregnated with a noble or transition metal or combinations thereof. As used herein, "metal catalyst" refers to the entire catalyst structure including the metal, inorganic metal oxide washcoat and the monolith support or monolith substrate. The active metals used in the present catalysts are selected from the group consisting of a transition or noble metal selected from the group of nickel, cobalt, iron, platinum, palladium, iridium, rhenium, ruthenium, rhodium and osmium and combinations thereof. Preferably the active metals are rhodium and/or nickel.

A monolith support is generally a ceramic foam-like or porous structure formed from a single structural unit having passages disposed in either an irregular or regular pattern with spacing between adjacent passages. Preferred are the ceramic foam structures having irregular passages. The support structures are made from conventional refractory or ceramic materials selected from the group consisting of alumina, mullite, zirconia, partially stabilized zirconia, ceria, silica, silicon carbide, silicon nitride, Sialon™, a silicon nitride ceramic with a small percentage of aluminum oxide added, aluminum nitride or boron nitride, aluminosilicate, magnesium aluminosilicates, and mixtures of these. Metal monoliths prepared as metal foams can also be used. The most preferred supports are partially stabilized zirconia or silicon carbide.

It is preferred to incorporate the active metals on a high surface area for improved overall catalyst effectiveness and activity. The surface area of the support can be increased by depositing a high-surface area inorganic metal oxide such as gamma alumina, ceria, etc. by impregnation, wash-coating, adsorption, ion-exchange, precipitation, co-precipitation, deposition precipitation, sol-gel method, slurry dip-coating, microwave heating, etc. Processes for coating substrates with inorganic metal oxides comprise contacting a substrate with a metal oxide precursor, preferably maintaining the precursor coated substrate at conditions to equilibrate the coating, and then oxidizing the precursor to form a substrate containing metal oxide. It is preferred to have macropores by adding decomposable organic matter to the washcoat and then decomposing it at high temperatures in an oxidizing atmosphere.

The stable high surface area inorganic oxides that can be washcoated are selected from but are not limited to oxides comprising one or more cations selected from groups IA, IIA, IIIA and IVA of the Periodic Table of the Elements and the transition metals, preferably from groups IA, IIA, IIIA, IIIB, IVA, IVB and the lanthanides, more preferably from ceria, aluminum, lanthanum, zirconium and barium and mixtures of these. The foam may be impregnated with more than one inorganic oxide simultaneously or sequentially.

Suitably the impregnating medium is in the form of an aqueous or organic solution, slurry, sol, gel, suspension or dispersion of inorganic oxide(s) particles, preferably of a sol of colloidal inorganic oxide(s) particles. The precursors of these washcoats are in any form that can be decomposed to an oxide by thermal decomposition. A stabilizing agent such as an oxide of alkaline or rare earth oxide may be added to the washcoat to prevent the sintering of washcoat during the reaction or pretreatment.

The most preferred support is a partially stabilized zirconia foam monolith washcoated with about 5% to about 30% inorganic metal oxide, most preferably ceria. Optionally ceramic honeycomb or metal monolith coated with noble metal can also be used as endothermic reaction catalyst.

In one aspect, the invention provides a process for the partial oxidation of hydrocarbons to produce hydrogen and carbon monoxide comprising contacting a mixture of a hydrocarbon-containing feed gas and an oxygen-containing feed gas with a catalytically effective multi-layer configuration, at a pressure between 1 and 20 atmospheres, a feed gas standard gas hourly space velocity of about 5,000 to about 500,000 per hour, and a linear velocity of about 0.2 to about 50.0 meter per second (mls). In addition, the feed gas mixture may also comprise steam and/or $CO_2$. The reactant gas mixture can also be preheated to a temperature of about 10 to about 450° C.

In an alternative embodiment of the present invention, the present inventors have discovered that effective partial oxidation of hydrocarbons is achieved by utilizing just the first layer of the catalytically active metal dispersed on an inert carrier support.

through the reactor. The total amount of feed mixture was maintained as in example 1. There was no deactivation of reaction performance over 5 hours of continuous operation. Higher product temperature, about 1200° C., compared with 900° C. typically observed for reticulate monolith only, was observed with carbon conversion of 70% and syngas selectivity of only 75%. No oxygen slip was detected. The used sample is still very strong with crush strength of more than 900 lbs.

To compare the effect of multi-layer configuration, a 1 inch diameter and 0.4 inch thick partially stabilized zirconia monolith, having 45 pores per inch, obtained from Vesuvius Hi-Tech Ceramics, was first washcoated with 20% ceria and then impregnated with 2% by weight of rhodium metal to prepare the metal catalyst. It was labeled as 'ST-1'. One ST-1 reticulate monolith is then stacked beneath large-pore honeycomb catalyst HC-1. In other words, the first layer was HC-1, in direct contacts with feed mixture and the second layer was the reticulate ST-1 catalyst.

A feed mixture containing 64 volume % methane and 36 volume % oxygen was passed through the reactor, as before. The total amount of feed mixture was maintained as in example 1. There was no deactivation of reaction performance over 5 hours of continuous operation. Lower product temperature, about 900° C., similar to that typically observed for reticulate monolith only, was observed. Carbon conversion increased to 95% with much higher syngas selectivity of about 94%. No oxygen slip was detected. Both used samples appear to be similar to the freshly prepared samples, as shown in the following table.

| Configurations | $CH_4$ Conv. | CO selectivity | $H_2$ selectivity | Used catalyst | Crush strength |
|---|---|---|---|---|---|
| HC-1 | 70% | 80% | 75% | No gray-color and strong | >900 lbs |
| HC-1 (upstream) followed by ST-1 (downstream) | 95% | 94% | 94% | No gray-color and strong | HC-1: >900 lbs<br>ST-1 (fresh): ~300 lbs<br>ST-1 (used): ~300 lbs |

EXAMPLE 1

A 1 inch diameter and 0.4 inch thick cordierite honeycomb monoliths having 400 cells per square inch (cpsi) was impregnated with 2% by weight of rhodium. A feed mixture containing 64 volume % methane and 36 volume % oxygen was passed through the reactor containing above catalyst at a space velocity of 150,000 per hour. Within 10 minutes from start up, $CH_4$ slip increased from 1% to 5%, no oxygen slip was observed. Product temperature increased from 900° C. to about 1200° C. The catalyst inspection after reaction indicated melting of the front layer of cordierite. This is in support of our understanding of higher temperature in the front due to exothermic reaction.

EXAMPLE 2

To further understand the reaction mechanism, a 1" diameter and 1" thick, large pore-size, ¼" $\alpha Al_2O_3$ honeycomb was impregnated with 3% by weight of rhodium metal (Rh/$Al_2O_3$), labeled as 'HC-1'. A feed mixture containing 64 volume % methane and 36 volume % oxygen was passed As shown above, although more thermal and structurally stable catalytic material (HC-1) with as the first layer alone gives relatively poor reaction performance. When it is combined with reticulate catalyst (ST-1), it effectively improves both carbon conversion and syngas. Catalyst front temperature was higher than the subsequent layer in the feed flow direction. Nearly complete $O_2$ conversion in the first layer strongly supports our understanding of higher temperature in the front due to exothermic reaction followed by endothermic reforming reactions.

COMPARATIVE EXAMPLE 2A

A feed mixture containing 64 volume % methane and 36 volume % oxygen was passed through the reactor containing ST-1 reticulate catalyst only after reaction was initiated with $H_2$ injection. The total amount of feed mixture was maintained as in example 2, corresponding to a space velocity of 150,000 per hour. There was no significant deactivation of reaction performance after 5 hours' of continuous operation with product temperature of about 900° C. and stable performance with 92% carbon conversion and 93% syngas selectivity. The key difference was that the reticulate monolith catalyst became very brittle after use.

| Configurations | $CH_4$ Conv. | CO selectivity | $H_2$ selectivity | Used catalyst | Crush strength |
|---|---|---|---|---|---|
| ST-1 only | 92% | 95% | 93% | Gray color on the front and very brittle | ST-1 (Fresh): ~300 Lbs<br>ST-1 (Used): 10 lbs |

EXAMPLE 3

Low surface area (0.25 $m^2/g$) ¼ inch $\alpha$-$Al_2O_3$ pellets were impregnated with 4% by weight of rhodium metal. To compare the long-term effect on the multi-layer configuration, a feed mixture containing natural gas and oxygen at a carbon to oxygen ratio of 1.73 was passed through the reactor with catalyst configuration of $1^{st}$ layer of 0.4 inch thick $Al_2O_3$ pellet catalyst followed by $2^{nd}$ layer of 1 inch length ST-1 monolith catalyst as in Example 2. The space velocity (S.V.) was 150,000 per hour, based on reticulate catalytic monolith only. This catalyst configuration remained in continuous operation for 6 months. There was no significant reduction in the catalyst performance or mechanical strength. The reactor outlet temperature was maintained at less than 800° C.

| Running Time | $CH_4$ Conv. | $H_2$ selectivity | CO selectivity | $T_{out}$ | Used sample appearance |
|---|---|---|---|---|---|
| 4 hrs | 93% | 93% | 95% | 650 | Both pellets and ST-1 monolith are as strong as freshly prepared |
| 12 hrs | 90% | 94% | 94% | 720 | |
| 10 days | 91% | 95% | 94% | 680 | |
| 6 weeks | 90% | 94% | 94% | 650 | |

EXAMPLE 4

To study the scale-up effect on the multi-layer configuration, one 10 inch diameter and 1 inch thick partially stabilized, zirconia reticulate-monolith having 45 pores per inch, obtained from Vesuvius Hi-Tech Ceramics, was washcoated with a 20% ceria, thereafter impregnated with 2% by weight of rhodium metal to prepare the metal catalyst, labeled as "ST-10".

Four 10 inch diameter and 1 inch thick $\alpha$-$Al_2O_3$ honeycombs with pore-size of ¼" were impregnated with 3% by weight of rhodium. A feed mixture containing NG and oxygen at carbon to oxygen ratio of 1.85 was passed through the reactor with catalyst configuration of $1^{st}$ layer of three 1" thick Rh/$Al_2O_3$ honeycombs, called 'HC-10', followed by a $2^{nd}$ layer of 10 inch ST-10 monolith. The space velocity (S.V.) was 120,000 per hour, based on the reticulate catalytic monolith only. There was no significant deactivation of reaction performance. The reactor outlet temperature was maintained at less than 850° C. After 5 hours of continuous operation with more than 95% carbon conversion and around 95% CO and $H_2$ selectivity, honeycombs and 10" ST-10 monolith catalyst were all as strong as when they were freshly prepared.

| Configurations | $CH_4$ Conv. | CO selectivity | $H_2$ selectivity | Used catalyst | Crush strength |
|---|---|---|---|---|---|
| HC-10 honeycomb (upstream) followed by ST-10 reticulate (downstream) | 95% | 95% | 93% | No gray color and strong | HC-10 (used): >900 lbs<br>ST-10 (Fresh): 300 lbs<br>ST-10 (Used): 300 lbs |

It should be understood that the subject invention is not limited by the examples set forth above. The scope of this invention is intended to include equivalent.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for the partial oxidation of hydrocarbons to produce hydrogen and carbon monoxide by contacting with a mixture of a hydrocarbon-containing feed gas and an oxygen-containing feed gas a catalyst composition comprising a first layer comprising a catalytically active metal selected from the group consisting of nickel, cobalt, iron, platinum, palladium, iridium, rhenium, ruthenium, rhodium, osmium and combinations thereof dispersed on an inert carrier support and a second layer comprising a reduced metal catalyst consisting essentially of a transition metal selected from the group consisting of nickel, cobalt, iron, platinum, palladium, iridium, rhenium, ruthenium, rhodium, osmium, and combinations thereof supported on or in a stable inorganic metal oxide washcoated on a support, wherein said first and said second layers are serially aligned and said first layer is more stable to temperatures in excess of 1100° C. than said second layer.

2. The method as claimed in claim 1 wherein said catalytically active metal is selected from the group consisting of rhodium and nickel.

3. The method as claimed in claim 2 wherein said catalytically active metal is rhodium.

4. The method as claimed in claim 1 wherein said catalytically active metal is deposited on said inert carrier support in an amount ranging from about 0.1% to about 8.0% by weight.

5. The method as claimed in claim 1 where said inert carrier support has a shape selected from the group consisting of honeycomb, sphere, pellet, ring, wagonwheel, saddles, and granule.

6. The method as claimed in claim 5 wherein said inert carrier support is a monolithic support having a honeycomb shape.

7. The method as claimed in claim 6 wherein said honeycomb monolithic support is made from a material selected from the group consisting of alumina, mullite, zirconia, partially stabilized zirconia, ceria, silica, silicon carbide, silicon nitride, silicon nitride ceramic, aluminum nitride, boron nitride, aluminosilicate, magnesium aluminosilicates, a combination of magnesium aluminosilicates and aluminosilicate, and mixtures thereof.

8. The method as claimed in claim 7 wherein said material is selected from the group consisting of alumina and partially stabilized zirconia.

9. The method as claimed in claim 1 wherein said inert carrier support has a surface area of about 0.1 to about 50.0 $m^2/g$.

10. The method as claimed in claim 1 wherein said support for the second layer is selected from the group consisting of a ceramic foam monolith, a honeycomb monolith, and a metal monolith.

11. The method as claimed in claim 10 wherein said support is ceria washcoated partially stabilized zirconia monolith support.

12. The method as claimed in claim 11 wherein said ceria-washcoated partially stabilized zirconia monolith support contains about 5% to about 30% ceria by weight.

13. The method as claimed in claim 1 wherein said transition metal is selected from the group consisting of rhodium, nickel and a mixture of rhodium and nickel.

14. The method as claimed in claim 1 wherein said transition metal is about 2 to about 4 percent by weight of said monolith support.

15. The method as claimed in claim 1 wherein said stable inorganic metal oxide is selected from the group consisting of oxides comprising one or more cations selected from the group consisting of groups IA, IIA, IIIA and IVA of the Periodic Table of the Elements, the transition metals and mixtures thereof.

16. The method as claimed in claim 15 wherein said cation is selected from the group consisting of ceria, aluminum, lanthanum, zirconium and barium and mixtures thereof.

17. The method as claimed in claim 16 wherein said cation is ceria.

18. The method as claimed in claim 1 wherein said inorganic metal oxide is about 5 to about 30 percent by weight of said monolith support.

19. The method as claimed in claim 15 wherein said stable inorganic metal oxide comprises an additional stabilizing agent selected from the group consisting of alkaline oxide of and rare earth oxide, thereby inhibiting the sintering of washcoat during reaction or pretreatment of said support.

20. The method as claimed in claim 6 wherein said ceramic foam monolith support is made from a material selected from the group consisting of alumina, mullite, zirconia, partially stabilized zirconia, ceria, silica, silicon carbide, silicon nitride, silicon nitride ceramic, aluminum nitride, boron nitride, aluminosilicate, magnesium aluminosilicates, a combination of magnesium aluminosilicates and aluminosilicate, and mixtures thereof.

21. The method as claimed in claim 20 wherein said material is selected from the group consisting of partially stabilized zirconia and silicon carbide.

22. The method as claimed in claim 1 comprising more than two layers.

23. The method as claimed in claim 1 further comprising a catalytically inactive substrate between said first layer and said second layer.

24. The method as claimed in claim 1 wherein said feed gas is at a pressure between about 1 to about 20 atmospheres.

25. The method as claimed in claim 1 wherein said feed gas has a standard gas hourly space velocity of about 5,000 to about 500,000 per hour.

26. The method as claimed in claim 1 wherein said feed gas has a linear velocity of about 0.2 to about 50.0 meters per second.

27. The method as claimed in claim 1 wherein said feed gas mixture is preheated to a temperature of about 10 to about 450° C.

28. The method as claimed in claim 1 further comprising adding steam and/or carbon dioxide to said feed gas mixture.

29. The method as claimed in claim 1 wherein during said partial oxidation said first layer maintains its crush strength.

30. The method as claimed in claim 1 wherein the crush strength of said first layer is not exceeded.

* * * * *